April 13, 1954     A. H. PRIVETT     2,675,457
LUNCH BOX
Filed May 16, 1950
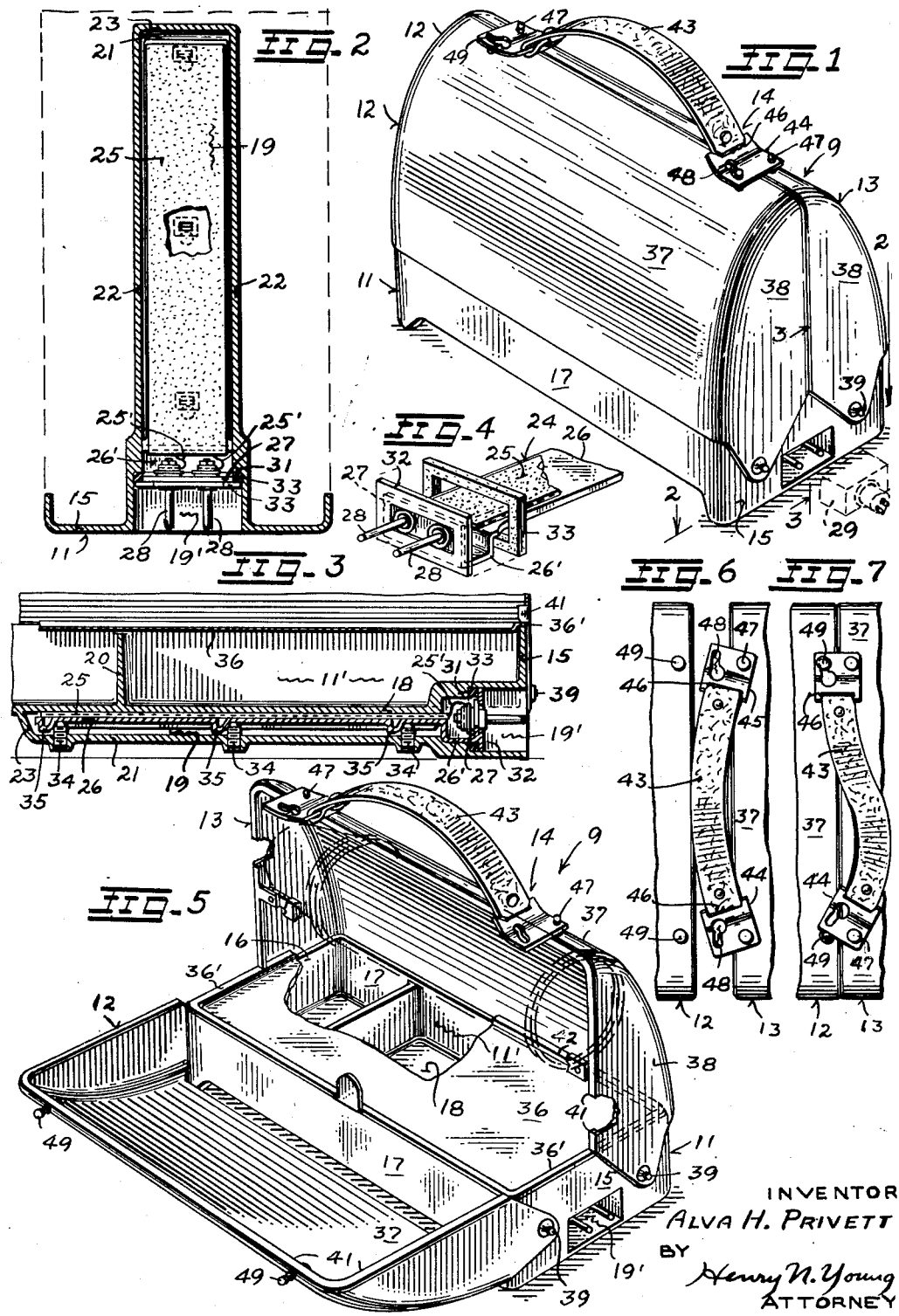
INVENTOR
ALVA H. PRIVETT
BY
Henry N. Young
ATTORNEY Patented Apr. 13, 1954

2,675,457

UNITED STATES PATENT OFFICE 2,675,457

LUNCH BOX

Alva H. Privett, Oakland, Calif.

Application May 16, 1950, Serial No. 162,340

3 Claims. (Cl. 219—35)

The invention relates to a lunch box unit, or the like, providing a food-receiving compartment arranged for its direct heating to condition food therein for its consumption.

An object of the invention is to provide an improved food container of the character described having a food-receiving compartment for heating food therein as an integral part of the unit.

Another object is to provide an improved lunch box of the character described providing a sealed-in electric heating unit for connection with a power source at the place where the food is to be consumed.

A further object is to provide an improved lunch box construction having relatively swingable side sections which are cooperative as a securing means for a cover for the heatable food compartment when the box is closed.

An added object is to provide a food-carrying container of the character described with a combined locking and handle-securing device for the closed container.

The invention possesses other objects and features of advantage, some of which, with the foregoing, will be set forth or be apparent in the following description of a typical embodiment of the invention, and in the accompanying drawings, in which, Figure 1 is a perspective view of the lunch box of my invention conditioned for the carrying of food therein.

Figure 2 is a sectional plan view taken at the plane of the line 2—2 in Figure 1.

Figure 3 is a fragmentary longitudinal section taken at the line 3—3 in Figure 1.

Figure 4 is a fragmentary perspective view of the connection end of an electric heating element of the lunch box.

Figure 5 is a perspective view showing one side of the lunch box in lowered position.

Figure 6 is a fragmentary plan view showing handle connections of the box as they appear when the box is partly open.

Figure 7 is a fragmentary plan view showing the box closed and having one handle element securing the upper box portions together.

As particularly illustrated, the features of my invention are incorporated in the structure of a portable lunch box 9 comprising a base element 11 having the ends of complementary side elements 12 and 13 hinged to them for providing a closure over the base 11, or for their mutual separation to open the box to provide access to its interior. A handle 14 is provided for use in supporting the closed box while directly operating to hold the box closed. The base 11 is formed to provide a rectangular pan space 11' defined by base ends 15 and 16 and base sides 17 extending integrally from a bottom 18. The base ends 15 and 16 extend somewhat below the bottom 18 for spacing the bottom from a supporting surface for the box, with minor end portions of the sides 17 extending as the ends below the bottom. An elongated cavity 19 of rectangular cross-section is provided along the under side of the tray bottom 18, said cavity extending from the base end 15, and being defined by a bottom 21 integrally connected to the tray bottom by sides 22 and an end wall 23.

It will now be noted that the cavity 19 is shaped and arranged for complementarily receiving an electrical heating unit 24 which comprises a flat rectangular heating element 25 of suitable structure for its purposes mounted on a backing plate 26 having a portion thereof opposite the element 25 and provided at one end with a portion 27 extending transversely of the heating element in spaced relation therefrom. The plate portion 27 mounts a pair of connector prongs 28 extending therethrough in appropriately insulated relation thereto and connected with the terminal wires 25' of the heating element 25, the prongs being spaced for simultaneous engagement with contacts within a suitable connector plug 29. As shown, the prongs 28 and the assembly 25—26 lie in the same plane; accordingly, the bottom edge of the prong-supporting member 27 is connected with the other backing plate by an L-sectioned backing plate portion 26'.

The rectangular prong-supporting plate 27 has a greater area than the portion of the cavity 19 which receives the heating unit, and the cavity 19 has a complementarily enlarged portion 19' for receiving this member across it. Except for the connector prongs 28, the heating unit 24 is preferably sealed in the cavity 19, and a sealing seat 31 is provided as a continuous planar outwardly-facing step within the bore of the enlarged cavity portion 19' for use in sealing-in the heating element. The present prong-carrying member 27 has the same size and shape as the cross-section of the cavity portion 19' which is inwardly of the seat 31, and mounts at its outer face an element 32 having a central opening which freely receives and protects the outer prong-mounting members within it and has its various edge portions extending as a continuous flange for disposal opposite the seat 31. The prongs 28 preferably extend no further than the outer end of the cavity portion 19' for protecting them from damage.

A continuous sealing gasket 33 of suitable heat resistant material is operatively engaged between the seat 31 and the extending edge of the plate 32 for sealing the electric heating unit within the cavity 19, and means are provided for sealedly setting the heating unit 24 in its place. By particular reference to Figures 2 and 3, it will be noted that the bottom 21 of the cavity 19 mounts a line of set-screws 34 extending therethrough in a longitudinal line and having their points conically tapered for wedgedly engaging offsets 35 of the plate 26 in such a manner that a tightening of the set-screws 34 is arranged to wedgedly force the heating unit 24 into the cavity 19 to render the sealing gasket 33 fully effective while positively clamping the positioned unit against the under side of the tray bottom 18.

It will now be noted that the described base and heating unit assembly per se generally comprises an electric cooking unit and that the structure, except for the heating unit 24, may be cast or otherwise formed as a one-piece structure of a suitably thermally conductive material, such a structure being particularly illustrated. A cover or lid 36 is provided for the cooking space 11' of the base 11, said lid being free with respect to the heating unit and having a transversely offset edge portion 36' for flat engagement on the top rim of the base pan to center the cover thereon. The present cavity 19 is shown as divided by a partition 20 into two compartments to provide for the simultaneous warming or cooking of different foods therein.

The present box side elements 12 and 13 comprise arched panels 37 connecting end plates 38 of generally triangular outline and extending opposite the base element ends 15 and 16 where they are hingedly secured by hinge pins 39 extending from said ends. The pairs of pins 39 for the different side elements 12 and 13 are so positioned that the side elements 17 may be swung together in mutually abutting relation (Fig. 1) to provide a closed space over the base 11, or be individually swung down (Fig. 5) to provide access to such space. The mutually abuttable U-shaped edges of the elements 12 and 13 are planar and are each provided with inturned flanges 41 arranged for their mutual flat engagement when the box is fully closed.

The ends 38 of the side elements 12 and 13 are preferably detachably engaged with the hinge pins 39 to provide for a removal of the elements to facilitate a cleaning of the lunch box parts. In the present structure, the pins 39 are provided with resiliently compressible heads arranged for their forcible engagement through slightly smaller holes provided near the points of triangular bottom portions of the element ends 38, said portions being triangular to provide for the flexibility needed for springing a portion outwardly of a pin head in mounting or dismounting a side element 12 or 13 with respect to the base element 11; the present arrangement for a swinging mounting of the side elements 12 and 13 on the base 11 is understood to comprise a usual type of snap connection between opposed elements.

It will now be particularly noted that the flanges 41 of the box side elements 12 and 13 terminate adjacent the hinged ends of the element ends 38 at such side points that their ends may bear against the edge flange 36' of the pan cover 36 to positively secure the same in fitted and generally sealing relation to the rim of the pan when the elements are in closed positions; in this manner, food or other material disposed in the pan space 11' may be positively retained in said space whenever the box is closed, at which time the bottom edge portions of the side panels 37 are arranged to engage flat against the outside of the base sides 17 to complete an effective enclosure of the box contents. Noting that the elements 12 and 13 may cooperatively provide a considerable space for articles above the pan cover 36, one of the side members 12 or 13 may be provided with a bar member 42 connecting corresponding portions of its flange 41, and so disposed that a thermos bottle, or other cylindrical container, may be frictionally mounted between it and the concave inner face of the opposed side panel 37.

Referring now to the handle 14, it will be seen that the same comprises a flexible grip strap 43 of leather, or other suitable material, connecting complementary locking-plate members 44 and 45; in the present structure, strap end portions are looped through slots 46 provided in the plates adjacent mutually opposed ends thereof. At corresponding opposite corners thereof, the plates 44 and 45 receive hinge pins 47 extending from the top of a side element 12 or 13 by which they are loosely attached for swinging over an outer face portion thereat, the mounting of the plates on the element 13 being particularly shown. Curved keyhole slots 48 extend from the other, and corresponding, opposite corners of the plates 44 and 45 toward the handle and to their enlarged end portions, and are arranged to receive headed pins 49 which are mounted on the top of the side member 12 opposite the hinge pins 47.

It will be understood that when the plates 44 and 45 are aligned with the strap 43 (Figure 1), they are arranged to secure the members 12 and 13 together thereat in close abutting relation. The release of a plate 44 or 45 may be effected by rocking it about its securing hinge pin 47 to dispose the head of the engaged pin at the enlarged end of the engaged slot 46 to permit a transverse release of the plate from the pin 49, the operative securing of a plate in place being reversedly effective. The operative portion of a slot 46 is preferably curved about an axis adjacent the corresponding hinge pin 47 and toward the other plate end whereby the outer slot edge may wedgedly react with the shank of an engaged pin 49 to firmly draw the tops of the side elements 12 and 13 together as the plate is rotated about the pin 47 to its final securing position in which it is frictionally held. For facilitating the necessary securing and releasing manipulations, the plates 44 and 45 may be slightly bent across at the enlarged ends of the keyhole slots, this form of the plates also insuring a free swinging engagement of the handle loops with the plates.

From the foregoing description taken in connection with the accompanying drawings, the advantages of the present lunch box will be readily understood by those skilled in the art to which the invention appertains. While I have described the principle of operation, together with a form of my invention which I now consider to comprise a preferred embodiment thereof, I desire to have it understood that the showing is primarily illustrative, and that such changes and developments may be made, when desired, as fall within the scope of the following claims.

I claim:

1. In a portable lunch box or the like, a one-piece base element of heat conducting material directly providing a cooking pan, side elements hinged to the base element and cooperative therewith to provide a closed article-receiving space above said pan when the box is closed, an electric heating unit mounted entirely within the pan bottom in direct thermal contact therewith, a handle for said box, and fastening members attaching the handle to a side element and directly cooperative with members of the other side element to secure the elements together in box-closing relation.

2. In an electrically heated lunch box or the like, a rectangular one-piece base element of heat-conducting material providing a cooking-pan depression and a closed cavity extending within its pan-bottom portion from a side thereof, an electric heating unit sealedly fixed within said cavity for a conduction of heat for heating the depression space through the element, a free lid sealedly engageable with the rim of said pan depression along its entire length, complementary cover elements hingedly connected to the ends of the base element for their mutually independent swinging to and from a closure position thereof in which their opposed edges abut in a common plane, and means provided by a cover element directly engageable with opposite ends of the mounted lid at said plane to sealedly clamp the same upon the pan rim when the element is in its closure position.

3. In a food-heating lunch box or the like, a one-piece base element of heat-conducting material directly providing a cooking pan above a closed recess in the base, a heating unit enclosed in said base recess for heating the pan from below, an unattached lid member sealedly engageable with the pan rim along its entire length, side elements hinged to the base element and cooperative therewith to provide a closed article-receiving space above said pan when the box is closed, and means on the side elements cooperatively and directly engageable with the mounted lid to forcibly engage and sealedly clamp the same against the pan rim along its entire periphery when the elements are in their full closure positions.

References Cited in the file of this patent

UNITED STATES PATENTS

| Number | Name | Date |
|---|---|---|
| 835,841 | Vogel | Nov. 13, 1906 |
| 1,046,887 | Stanley | Dec. 10, 1912 |
| 1,093,110 | Christopher | Apr. 14, 1914 |
| 1,412,761 | Tingstrom | Apr. 11, 1922 |
| 1,462,245 | Reglein | July 17, 1923 |
| 1,597,092 | McTighe | Aug. 24, 1926 |
| 1,685,030 | Lavoie | Sept. 18, 1928 |
| 1,779,159 | Coe | Oct. 21, 1930 |
| 2,295,221 | King | Sept. 8, 1942 |
| 2,504,132 | Jones | Apr. 18, 1950 |
| 2,505,405 | Jarboe | Apr. 25, 1950 |
| 2,545,127 | Wnuk | Mar. 13, 1951 |
| 2,577,870 | Aston | Dec. 11, 1951 |

FOREIGN PATENTS

| Number | Country | Date |
|---|---|---|
| 232,478 | Switzerland | Aug. 16, 1944 |